(12) United States Patent
Lemieux et al.

(10) Patent No.: US 10,751,981 B2
(45) Date of Patent: Aug. 25, 2020

(54) COMPOSITE PANEL, COMPOSITE MATERIAL, IMPREGNATOR AND METHOD FOR MANUFACTURING A COMPOSITE PANEL

(71) Applicant: ANNEXAIR INC., Drummondville (CA)

(72) Inventors: François Lemieux, Drummondville (CA); Rhéal Comte, Saint-Hyacinthe (CA)

(73) Assignee: ANNEXAIR INC., Drummondville (CA)

(*) Notice: Subject to any disclaimer, the term of this patent is extended or adjusted under 35 U.S.C. 154(b) by 0 days.

(21) Appl. No.: 16/407,150

(22) Filed: May 8, 2019

(65) Prior Publication Data

US 2019/0263100 A1 Aug. 29, 2019

Related U.S. Application Data

(63) Continuation of application No. PCT/IB2017/057625, filed on Dec. 4, 2017.

(51) Int. Cl.
*B32B 29/02* (2006.01)
*B32B 29/00* (2006.01)
(Continued)

(52) U.S. Cl.
CPC ........... *B32B 29/02* (2013.01); *B32B 5/18* (2013.01); *B32B 7/10* (2013.01); *B32B 27/04* (2013.01);
(Continued)

(58) Field of Classification Search
CPC . B32B 29/02; B32B 29/007; B32B 2260/021; B32B 2266/0264;
(Continued)

(56) References Cited

U.S. PATENT DOCUMENTS 3,255,617 A 6/1966 Bisang
3,707,859 A 1/1973 Jones et al.
(Continued)

FOREIGN PATENT DOCUMENTS

CA 2013848 A1 10/1990
CA 1336483 C 8/1995
(Continued)

OTHER PUBLICATIONS

International Search Report and Written Opinion with regard to PCT/IB2017/057623 dated Aug. 14, 2018.
(Continued)

*Primary Examiner* — Elizabeth C Imani
(74) *Attorney, Agent, or Firm* — BCF LLP

(57) ABSTRACT

A composite panel comprising a first composite skin having a first fabric layer positioned between a first Kraft paper layer and a second Kraft paper layer; a second composite skin having a second fabric layer positioned between a third Kraft paper layer and a fourth Kraft paper layer; a foam core bonded to the first composite skin and to the second composite skin; and a binding composition applied to the first fabric layer and to the second fabric layer and penetrating the second Kraft paper layer and the third Kraft paper layer so that the first composite skin is bonded to a first surface of the foam core and the second composite skin is bonded to a second surface of the foam core, the binding composition being a bio resin.

9 Claims, 9 Drawing Sheets

(51) Int. Cl.
  *B32B 38/08* (2006.01)
  *B32B 27/10* (2006.01)
  *B32B 27/04* (2006.01)
  *B32B 7/10* (2006.01)
  *B32B 5/18* (2006.01)
  *B32B 37/12* (2006.01)
  *B32B 37/20* (2006.01)

(52) U.S. Cl.
  CPC ............ *B32B 27/10* (2013.01); *B32B 29/007* (2013.01); *B32B 37/12* (2013.01); *B32B 37/20* (2013.01); *B32B 38/08* (2013.01); B32B 2260/021 (2013.01); B32B 2260/028 (2013.01); B32B 2260/046 (2013.01); B32B 2262/101 (2013.01); B32B 2266/0264 (2013.01); B32B 2305/022 (2013.01)

(58) Field of Classification Search
  CPC ........ B32B 2260/046; B32B 2260/028; B32B 2262/101
  USPC ......... 442/224, 226, 259, 297; 428/119, 120
  See application file for complete search history.

(56) References Cited

U.S. PATENT DOCUMENTS

| | | | |
|---|---|---|---|
| 4,496,415 A | 1/1985 | Sprengling | |
| 4,498,941 A | 2/1985 | Goldsworthy | |
| 4,877,476 A | 10/1989 | Wolf | |
| 4,940,013 A | 7/1990 | Zimmer | |
| 4,983,453 A | 1/1991 | Beall | |
| 5,104,698 A | 4/1992 | Hayashi et al. | |
| 5,286,320 A | 2/1994 | McGrath et al. | |
| 5,670,220 A * | 9/1997 | Skoien ................ | B32B 37/0076 229/120.31 |
| 6,815,380 B2 | 11/2004 | Snyder | |
| 6,890,484 B2 | 5/2005 | Bautista et al. | |
| 6,924,243 B2 | 8/2005 | Snyder | |
| 7,597,534 B2 | 10/2009 | Hopkins | |
| 7,714,524 B2 | 5/2010 | Frankel et al. | |
| 7,731,046 B2 | 6/2010 | Johnson | |
| 7,785,693 B2 | 8/2010 | Johnson et al. | |
| 8,546,278 B2 | 10/2013 | Paradis et al. | |
| 8,814,639 B1 | 8/2014 | Mecozzi | |
| 8,940,381 B2 | 1/2015 | Ellis | |
| 8,956,714 B2 | 2/2015 | Vermeulen | |
| 9,057,204 B2 | 6/2015 | Friedrich et al. | |
| 9,132,607 B2 | 9/2015 | Kasuga et al. | |
| 9,138,943 B2 | 9/2015 | Weinberg et al. | |
| 9,328,859 B2 | 5/2016 | Yin et al. | |
| 9,493,938 B2 | 11/2016 | Schiffmann et al. | |
| 9,715,872 B2 | 7/2017 | Guzman et al. | |
| 2001/0006131 A1 | 7/2001 | Bream | |
| 2002/0014302 A1 | 2/2002 | Fanucci et al. | |
| 2002/0160680 A1* | 10/2002 | Laurence ................ | B32B 27/36 442/394 |
| 2003/0089238 A1 | 5/2003 | Viereck et al. | |
| 2003/0198775 A1 | 10/2003 | Roth et al. | |
| 2010/0154534 A1 | 6/2010 | Hampton | |
| 2010/0279017 A1 | 11/2010 | Eckstein | |
| 2011/0262720 A1* | 10/2011 | Riebel ....................... | B32B 7/12 428/195.1 |
| 2012/0244015 A1 | 9/2012 | Benson et al. | |
| 2012/0301623 A1 | 11/2012 | Parrella et al. | |
| 2013/0106014 A1 | 5/2013 | Ishibashi et al. | |
| 2014/0054830 A1 | 2/2014 | Hindersmann et al. | |
| 2014/0335361 A1 | 11/2014 | Ellis et al. | |
| 2015/0140269 A1* | 5/2015 | Bahnmiller ................ | B32B 5/14 428/141 |

FOREIGN PATENT DOCUMENTS

| | | |
|---|---|---|
| CA | 2975771 A1 | 8/2016 |
| CN | 103160068 A | 6/2013 |
| EP | 1503896 A1 | 2/2005 |
| GB | 1521699 A | 8/1978 |
| GB | 2529061 A | 2/2016 |
| GB | 2529571 A | 2/2016 |
| JP | 2017043878 A | 3/2017 |
| WO | 2012056202 A1 | 5/2012 |

OTHER PUBLICATIONS

International Search Report and Written Opinion with regard to PCT/IB2017/057625 dated Aug. 10, 2018.
International Search Report and Written Opinion with regard to PCT/IB2017/057624 dated Aug. 3, 2018.
English Abstract for CN103160068 retrieved on Espacenet on May 1, 2019.
English Abstract for JP2017043878 retrieved on Espacenet on Aug. 19, 2018.
Office Action with regard to the counterpart U.S. Appl. No. 16/407,147 dated Nov. 19, 2019.
Office Action with regard to the counterpart U.S. Appl. No. 16/407,155 dated Aug. 22, 2019.
Office Action with regard to the counterpart U.S. Appl. No. 16/407,155 dated Dec. 12, 2019.

\* cited by examiner

COMPOSITE PANEL, COMPOSITE MATERIAL, IMPREGNATOR AND METHOD FOR MANUFACTURING A COMPOSITE PANEL

CROSS-REFERENCE

The present application is a continuation of International Patent Application No. PCT/IB2017/057625, filed on Dec. 4, 2017, entitled "COMPOSITE PANEL, COMPOSITE MATERIAL, IMPREGNATOR AND METHOD FOR MANUFACTURING A COMPOSITE PANEL", the entirety of which is incorporated herein.

FIELD

The present technology relates to composite panels, composite material, impregnator and method for manufacturing composite panels. In some embodiments, but without being limitative, the composite panels manufactured in accordance with the present method may be used for the manufacturing of casings of air conditioning units.

BACKGROUND

Air conditioning units, in particular air conditioning units designed for commercial and/or industrial applications are usually bundled into casings. Such casings are typically made of panels designed so as to withstand certain constraints, in particular mechanical constraints and thermic constraints.

With respect to the mechanical constraints, the panels are designed so as to provide sufficient stiffness to allow displacement and installation of the air conditioning units, taking into consideration that air conditioning units designed for commercial and/or industrial applications may carry hundreds or even thousands kilograms of equipment (e.g., compressors, pumps, cooling assemblies, etc.).

With respect to the thermic constraints, the panels are designed so as to withstand important thermic variations without bonding and/or impairing mechanical properties of the casing, in particular thermic variations between an inside environment and an outside environment of the air conditioning unit, taking into consideration that such variations may reach up to 40 Celsius degrees in certain extreme environments.

Even though composite panels and/or composite materials have been widely used in many industries, such as the aerospace and the automobile industries, it is not yet the case in the air conditioning industry. In particular, air conditioning units designed for commercial and/or industrial applications are still mainly made of metallic materials. For example, frames of the units and panels that are used for the outside casing and for dividing compartments within the air conditioning units are typically made of metallic materials such as aluminium and/or metallic alloys.

Improvements may therefore be desirable, in particular improvements relating to composite panels, composite material and method of manufacturing composite panels that are, amongst other applications, to be used for the manufacturing of casings of air conditioning units.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

In one aspect, various implementations of the present technology provide a composite panel comprising:
a first composite skin having a first fabric layer positioned between a first Kraft paper layer and a second Kraft paper layer;
a second composite skin having a second fabric layer positioned between a third Kraft paper layer and a fourth Kraft paper layer;
a foam core bonded to the first composite skin and to the second composite skin; and
a binding composition applied to the first fabric layer and to the second fabric layer and penetrating the second Kraft paper layer and the third Kraft paper layer so that the first composite skin is bonded to a first surface of the foam core and the second composite skin is bonded to a second surface of the foam core, the binding composition being a bio resin.

In some embodiments, the binding composition further penetrates the first Kraft paper layer and the fourth Kraft paper layer so as to form a first hardened surface of the composite panel and a second hardened surface of the composite panel.

In some other embodiments, a composition of the bio resin comprises PolyFurfuryl Alcohol (PFA).

In some embodiments, the first fabric layer and the second fabric layer comprise glass fibers, the glass fibers having a wet lay up thickness of about 2.4 millimeters.

In some embodiments, the composite panel withstand a temperature delta between a first environment contacting the first composite skin and a second environment contacting the second composite skin of about 40 Celsius degrees.

In some other embodiments, the foam core is made of PolyEthylene Terephthalate (PET).

In some other embodiments, the first Kraft paper layer, the second Kraft paper layer, the third Kraft paper layer and the fourth Kraft paper layer have a weight of 127 $g/m^2$.

In some embodiments, the first composite skin and the second composite skin are coplanar, the composite panel further comprising a third composite skin having a third fabric layer positioned between a fifth Kraft paper layer and a sixth Kraft paper layer, the third composite skin connecting to the first composite skin and to the second composite skin by extending through the foam core, perpendicularly to the first composite skin and the second composite skin.

In some embodiments, the casing of an air conditioning unit comprises the composite panel.

In yet another aspect, various implementations of the present technology provide a composite material comprising:
a first fabric layer positioned between a first Kraft paper layer and a second Kraft paper layer, the first fabric layer comprising glass fibers, the glass fibers having a wet lay up thickness of about 2.4 millimeters; and
a binding composition applied to the first fabric layer and penetrating the first Kraft paper layer and the second Kraft paper layer, the binding composition being a bio resin comprising PolyFurfuryl Alcohol (PFA).

In another aspect, various implementations of the present technology provide a composite panel comprising:
a first skin having a first fabric layer positioned between a first Kraft paper layer and a second Kraft paper layer;
a foam core bonded to the first skin; and a binding composition applied to the first fabric layer and penetrating the second Kraft paper layer so that the first skin is bonded to a first surface of the foam core, the binding composition being a bio resin.

In yet another aspect, various implementations of the present technology provide a method for manufacturing a composite material, the method comprising:

positioning a first fabric layer between a first Kraft paper layer and a second Kraft paper layer;

impregnating the first fabric layer with a binding composition while maintaining the first Kraft paper layer and the second Kraft paper layer dry;

assembling the impregnated first fabric layer, the first Kraft paper layer and the second Kraft paper layer together to form a first pre-impregnated multilayer assembly;

applying pressure on the first pre-impregnated multilayer assembly to diffuse the binding composition from the first fabric layer to the first Kraft paper layer and the second Kraft paper layer; and curing the first pre-impregnated multilayer assembly.

In another aspect, impregnating the first fabric layer comprises translating the first fabric layer through an impregnator containing the binding composition.

In yet another aspect, impregnating the first fabric layer is conducted while the first Kraft paper layer and the second Kraft paper layer are bypassing the impregnator.

In another aspect, the impregnated first fabric layer, the first Kraft paper layer and the second Kraft paper layer are assembled downstream the impregnator.

In yet another aspect, the method further comprises prior to applying pressure on the first pre-impregnated multilayer assembly:

laying the first pre-impregnated multilayer assembly on a first surface of a foam core;

cutting up the first pre-impregnated multilayer assembly;

forming a second pre-impregnated multilayer assembly from the impregnated first fabric layer, the first Kraft paper layer and the second Kraft paper layer;

laying the second pre-impregnated multilayer assembly on a second surface of the foam core; and cutting up the second pre-impregnated multilayer assembly.

In another aspect, applying pressure on the first pre-impregnated multilayer assembly further comprises applying pressure on the foam core and the second pre-impregnated multilayer assembly so that the binding composition penetrates the first Kraft paper layer and the second Kraft paper layer of the first pre-impregnated multilayer assembly and penetrates the first Kraft paper layer and the second Kraft paper layer of the second pre-impregnated multilayer assembly.

In yet another aspect, curing the first pre-impregnated multilayer assembly further comprises curing the foam core and the second pre-impregnated multilayer assembly so as to form a composite panel.

In another aspect, positioning the first fabric layer between the first Kraft paper layer and the second Kraft paper layer further comprises positioning a first veil layer between the first fabric layer and the first Kraft paper layer and positioning a second veil layer between the first fabric layer and the second Kraft paper layer.

In yet another aspect, positioning the first fabric layer between the first Kraft paper layer and the second Kraft paper layer comprises unrolling a first roll comprising the first fabric layer, unrolling a second roll comprising the first Kraft paper layer and unrolling a third roll comprising the second Kraft paper layer.

In yet another aspect, various implementations of the present technology provide impregnator for impregnating a fabric layer comprising:

a chamber extending along a longitudinal axis, the chamber being structured and arranged so as to retain a binding composition in a fluid state;

a first opening extending along the longitudinal axis of a top portion of the chamber, the first opening being structured and arranged so as to allow the fabric layer entering the chamber in a dry state from the top portion of the chamber to be dived into the binding composition; and a second opening extending along the longitudinal axis of a bottom portion of the chamber, the second opening being structured and arranged to allow the fabric layer to exit from the bottom portion of the chamber in an impregnated state, the second opening comprising a first lip structured and arranged to be in contact with a first surface of the fabric layer and a second lip structured and arranged to be in contact with a second surface of the fabric layer.

In another aspect, the first lip and the second lip form a control assembly allowing control of an impregnation rate of the binding composition impregnating the fabric layer.

In yet another aspect, the first lip, the fabric layer and the second lip form a sealing assembly allowing the fabric layer to translate through the second opening while preventing the binding composition to leak from the chamber.

In another aspect, the impregnator further comprises a first lateral seal positioned at a first lateral extremity of the chamber and a second lateral seal positioned at a second lateral extremity of the chamber, the first lateral seal being structured and arranged so that a first lateral band of the fabric layer remains dry while the fabric layer translates through the chamber and the second lateral seal being structured and arranged so that a second lateral band of the fabric layer remains dry while the fabric layer translates through the chamber.

In yet another aspect, the impregnator further comprises an inlet, a sensor and a controller, the inlet allowing binding composition to be injected into the chamber, the sensor allowing measurement of a level of the binding composition in the chamber and the controller comprising control logic allowing to control the inlet based on a reading generated by the sensor.

In another aspect, the control logic further comprises instructions allowing to maintain a level of the binding composition constant while the fabric layer translates through the chamber.

Amongst other benefits, the composite panels and the composite material may allow (1) to withstand a substantial variation (i.e., delta) between a temperature inside an air conditioning unit and a temperature outside the air conditioning unit without bending and/or altering mechanical properties of the panel; (2) to carry a required mechanical load (e.g., upon lifting off an air conditioning unit with a crane for installation on top of a building) while being lighter than conventional metallic materials; and/or (3) to present a certain level of fire protection (i.e., not easily flammable) so as to meet strengthened regulations.

Amongst other benefits, the impregnator used for the manufacturing of composite material and the method for manufacturing composite panels may allow (1) to produce panels within a cycle time suitable for high volume production (e.g., less than 30 minutes per panel) and/or (2) limit the risk of having liquid resin to spill during the manufacturing thereby allowing to maintain a clean manufacturing environment.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. With these fundamentals in place, we will now consider some non-limiting examples to illustrate various implementations of aspects of the present technology.

Figure 1:
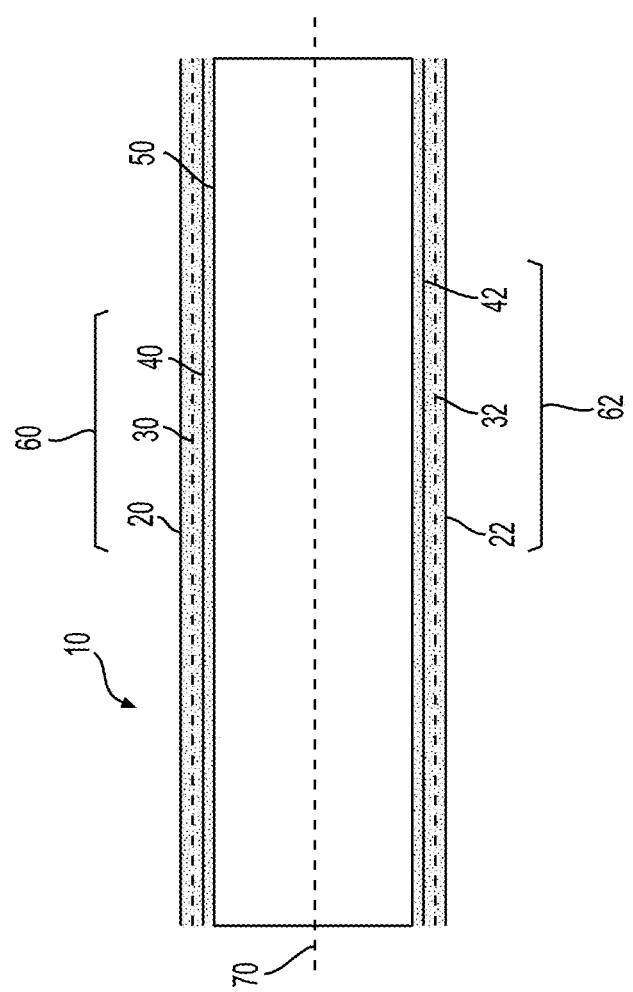
FIG. 1 is a cross-sectional view of a composite panel in accordance with an embodiment of the present technology.

Referring to FIG. 1, there is shown a cross-section view of a composite panel 10. The composite panel 10 comprises a first composite skin 60, a foam core 50 and a second composite skin 62. In the illustrated embodiment, the first composite skin 60 comprises a first fabric layer 30 positioned between a first Kraft paper layer 20 and a second Kraft paper layer 40. The second composite skin 62 comprises a second fabric layer 32 positioned between a third Kraft paper layer 42 and a fourth Kraft paper layer 22. In the illustrated embodiment, the composite panel 10 is symmetrical about an axis 70.

A binding composition applied to the first fabric layer 30 and to the second fabric layer 32 penetrates the second Kraft paper layer 40 and the third Kraft paper layer 42 so that the first composite skin 60 is bonded to a first surface of the foam core 50 and the second composite skin 62 is bonded to a second surface of the foam core 50. In the illustrated embodiment, the binding composition further penetrates the first Kraft paper layer 20 and the fourth paper layer 22 so as to form a first hardened surface of the composite panel 10 and a second hardened surface of the composite panel 10. In some embodiments, a first veil layer is positioned between the first fabric layer 30 and the first Kraft paper layer 20 and a second veil layer is positioned between the first fabric layer 30 and the second Kraft paper layer 40. In such embodiments, the first veil layer and the second veil layer may increase a diffusing rate of the binding composition and improve uniformity of how the binding composition is spread across the surfaces of the various layers. Similarly, a third veil layer may be positioned between the second fabric layer 32 and the third Kraft paper layer 42 and a fourth veil layer may be positioned between the second fabric layer 32 and the fourth Kraft paper layer 22.

In some embodiments, the binding composition is a bio resin. The bio resin is a non-phenolic resin. In some embodiments, the bio resin does not comprise fire resistant filler material. In some embodiments, the bio resin is a non-phenolic resin which does not comprise fire resistant filler material. As such, the bio resin is not a phenolic resin as may be found in connection with the manufacturing of conventional fire-rated laminates. The bio resin is a resin that derives some or all of its constituent monomers from biological sources. In some embodiments, the bio resin comprises PolyFurfuryl Alcohol (PFA). In some embodiments, the bio resin is based on a PFA backbone. In some embodiments, the bio resin is free of Volatile Organic Compounds (VOC) as it is typically found in phenolic resins. As a result, the bio resin may reduce exposure to potential chemical hazards that may otherwise typically occur during manipulation of phenolic resin.

In some embodiments, the bio resin impregnates the first fabric layer 30 and the second fabric layer 32. After pressure is applied on the composite panel 10 during manufacturing, the bio resin penetrates the first Kraft paper layer 20, the second Kraft paper layer 40, the third Kraft paper layer 42 and the fourth Kraft paper layer 22. Once cured, the bio resin hardens thereby forming rigid surfaces formed by the first Kraft paper layer 20, the fourth Kraft paper layer 22. It should be understood that other type of bio resin may equally be used without departing from the scope of the present technology.

In some embodiments, the first fabric layer 30 and the second fabric layer 32 are made from the same fabric material. In some embodiments, the fabric material comprises glass fibers. In some embodiments, the fabric material is selected so that the glass fibers have a wet lay up thickness of about 2.4 millimeters. In some embodiments, the wet lay up thickness ranges from 2.3 to 2.5 millimeters. In some embodiments, the wet lay up thickness ranges from 2.2 to 2.6 millimeters. In some embodiments, the wet lay up thickness ranges from 2.0 to 2.8 millimeters. In some embodiments, the fabric material is E-Glass™. It should be understood that other type of fabric materials may equally be used without departing from the scope of the present technology.

In some embodiments, the first Kraft paper layer 20, the second Kraft paper layer 40, the third Kraft paper layer 42 and the fourth Kraft paper layer 22 are made from the same Kraft paper material. In some other embodiments, the first Kraft paper layer 20, the second Kraft paper layer 40, the third Kraft paper layer 42 and the fourth Kraft paper layer 22 are made from distinct Kraft paper materials. In some embodiments, the Kraft paper material has a packaging paper grade. In some embodiments, the Kraft paper material has a weight of 127 g/m². In some embodiments, the Kraft paper material has a weight which may range from 122 g/m² to 137 g/m². In some embodiments, the Kraft paper material is selected so as to allow proper penetration by the bio resin prior to curing of the composite panel 10. It should be understood that various types of Kraft paper material may be used without departing from the scope of the present technology.

In some embodiments, the foam core 50 is made from PolyEthylene Terephthalate (PET). In other embodiments, the foam core 50 may be made of different material than PET. The thickness and shape of the foam core 50 may vary depending of the application. In the illustrated examples, the thickness of the foam core 50 may be selected so that the composite panel 10 may be suitable for being part of a casing of an air conditioning unit. In the illustrated embodiment, the foam core 50, the first composite skin 60 and the second composite skin 62 are coplanar and symmetrical about the axis 70.

Amongst multiple applications, the specific construction of the composite panel 10 may make it suitable for being used in the manufacturing of casings of air conditioning units, in particular as panels to be used for an outside of the casings and/or dividers installed within the casings of air conditioning units. The specific construction of the first composite skin 60, the foam core 50 and the second composite skin 62 may provide one or more of the following benefits, namely (1) withstanding a substantial variation (i.e., delta) between a temperature inside an air conditioning unit and a temperature outside the air conditioning unit without bending and/or altering mechanical properties of the panel; (2) carrying a required mechanical load (e.g., upon lifting off an air conditioning unit with a crane for installation on top of a building) while being lighter than conventional metallic materials; and/or (3) presenting a certain level of fire protection (i.e., not easily flammable) so as to meet strengthened regulations. In some embodiments, the specific combination of the fabric layer, the Kraft paper layer and the bio resin as previously specified in the paragraph above allows meeting the norm ASTM E84 Cl. 1 with a flame index of 5 or less and a smoke index of 30 or less. With respect to withstanding a substantial variation (i.e., delta) between a temperature inside an air conditioning unit and a temperature outside the air conditioning unit, in some embodiments, the composite panel 10 may withstand a temperature delta between a first environment contacting the first composite skin and a second environment contacting the second composite skin of about 40 Celsius degrees.

Other configurations of the composite panel 10 may also be envisioned, such as, but without being limitative, a composite panel comprising only a first composite skin and a foam core. In some alternative embodiments, the second composite skin may be replaced by a different skin and/or a different material. As an example, an alternative embodiment of composite panels may comprise a first composite skin having a first fabric layer positioned between a first Kraft paper layer and a second Kraft paper layer; a foam core bonded to the first composite skin; and a binding composition applied to the first fabric layer and penetrating the second Kraft paper layer so that the first composite skin is bonded to a first surface of the foam core, the binding composition being a bio resin.

In yet some alternative embodiments, the first composite skin may form a composite material in itself which may be used for other applications (i.e., other than to be used in conjunction with a foam core and/or to be part of a composite panel). As an example, such composite material may comprise a first fabric layer positioned between a first Kraft paper layer and a second Kraft paper layer, the first fabric layer comprising glass fibers, the glass fibers having a wet lay up thickness of about 2.4 millimeters; and a binding composition applied to the first fabric layer and penetrating the first Kraft paper layer and the second Kraft paper layer, the binding composition being a bio resin comprising Poly-Furfuryl Alcohol (PFA.

Figure 2:
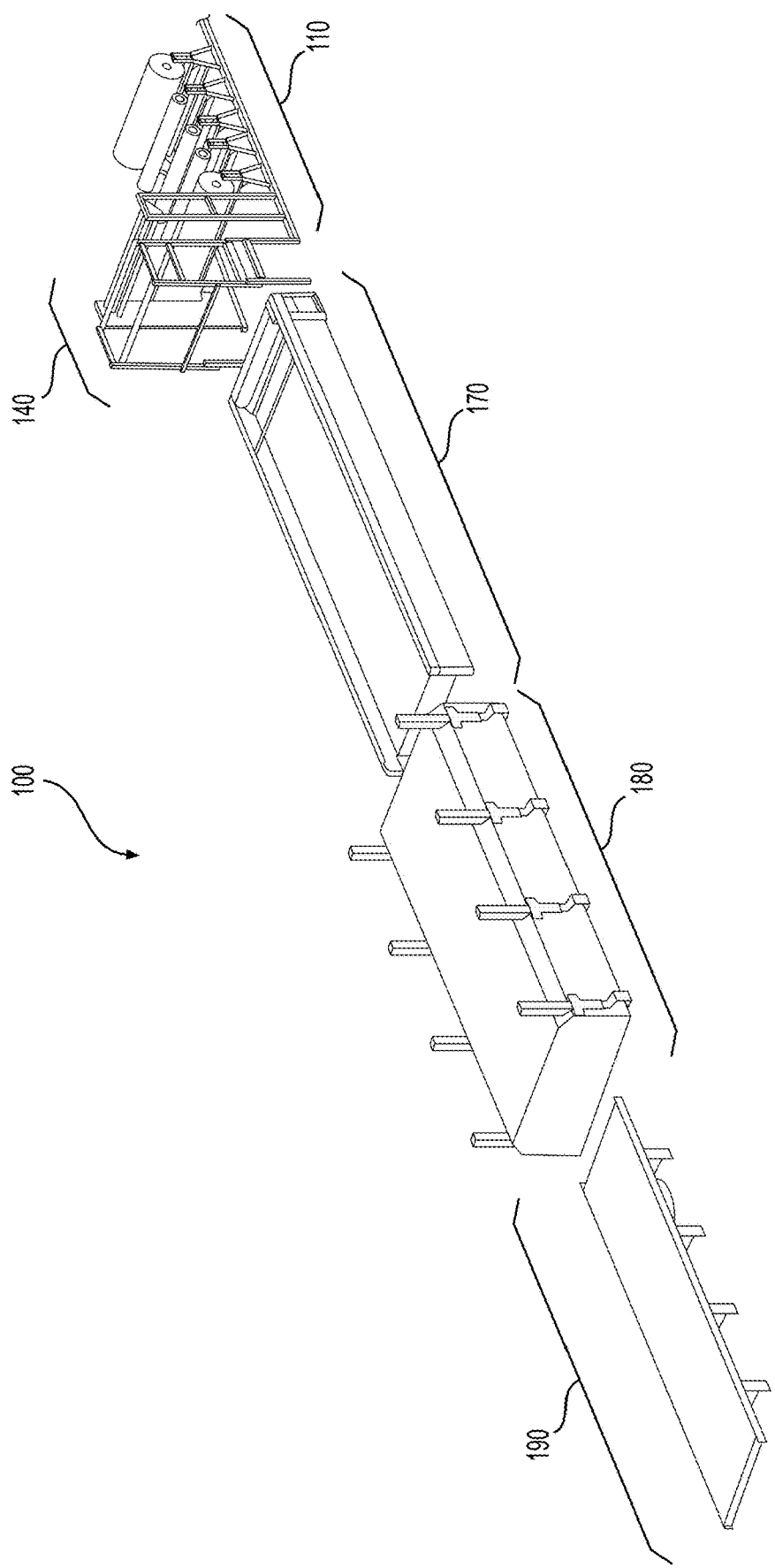
FIG. 2 is a perspective view taken from a top, front, left side of a manufacturing line in accordance with an embodiment of the present technology.

Turning now to FIG. 2, an embodiment of a manufacturing line 100 is illustrated. In some embodiments, the manufacturing line 100 is used for the manufacturing of composite panels such as the composite panel 10 described in the previous paragraphs of the present document. In the embodiment illustrated at FIG. 2, the manufacturing line 100 comprises a row material rack 110, an impregnation module 140, a conveyor 170, a curing module 180 and a stocking module 190.

Figure 3:
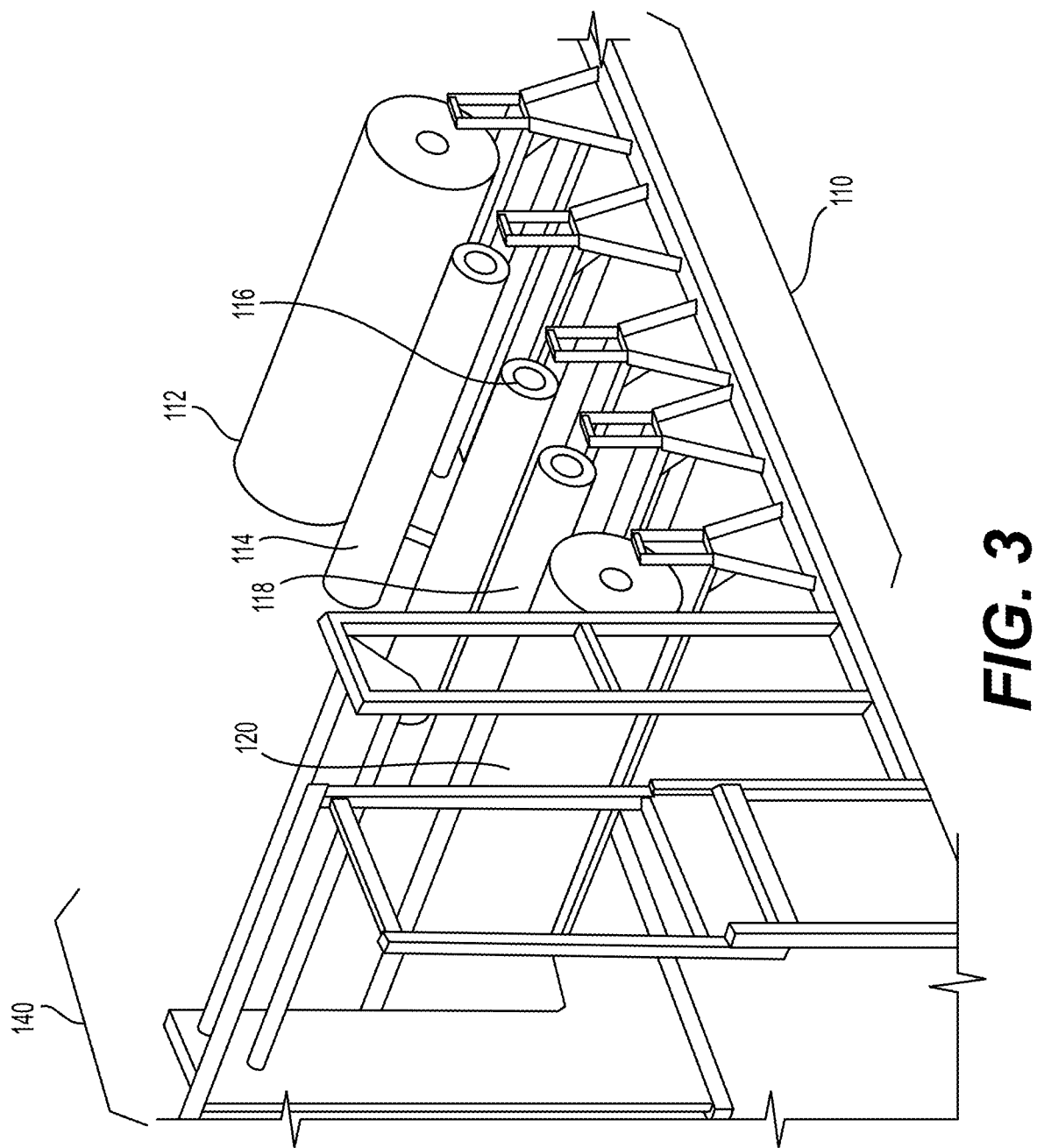
FIG. 3 is a perspective view taken from a top, front, left side of a row material rack being a sub-portion of the manufacturing line of FIG. 2.

The row material rack 110 illustrated at FIG. 3 is adapted to receive and maintain in place rolls of row materials to be used in connection with the manufacturing of the composite panel 10. In the illustrated embodiment, the rolls comprise a first roll of Kraft paper 120, a second roll of Kraft paper 112, a third roll of fabric 116, a fourth roll of veil 118 and a fifth roll of veil 114. In some embodiments, the first roll of Kraft paper 120 may form what is referred to hereinafter as a first Kraft paper layer 120. The second roll of Kraft paper 112 may form what is referred to hereinafter as a second Kraft paper layer 112. The third roll of fabric 116 may form what is referred to hereinafter as a first fabric layer 116. The fourth roll of veil 118 may form what is referred to hereinafter as a first veil layer and the fifth roll of veil 114 may form what is referred to hereinafter as a second veil layer.

In some embodiments, a dimension of the rolls and a quantity of row material contained by each one of the rolls may be adapted for mass production of composite panels, such as the composite panel 10. Therefore, the first roll of Kraft paper 120, the second roll of Kraft paper 112, the third roll of fabric 116, the fourth roll of veil 118 and the fifth roll of veil 114 may allow production of multiple composite panels without a need to replace them each time a composite panel is manufactured. In addition, the dimension of the rolls may vary depending on the size of the composite panels to be manufactured.

Figure 4:
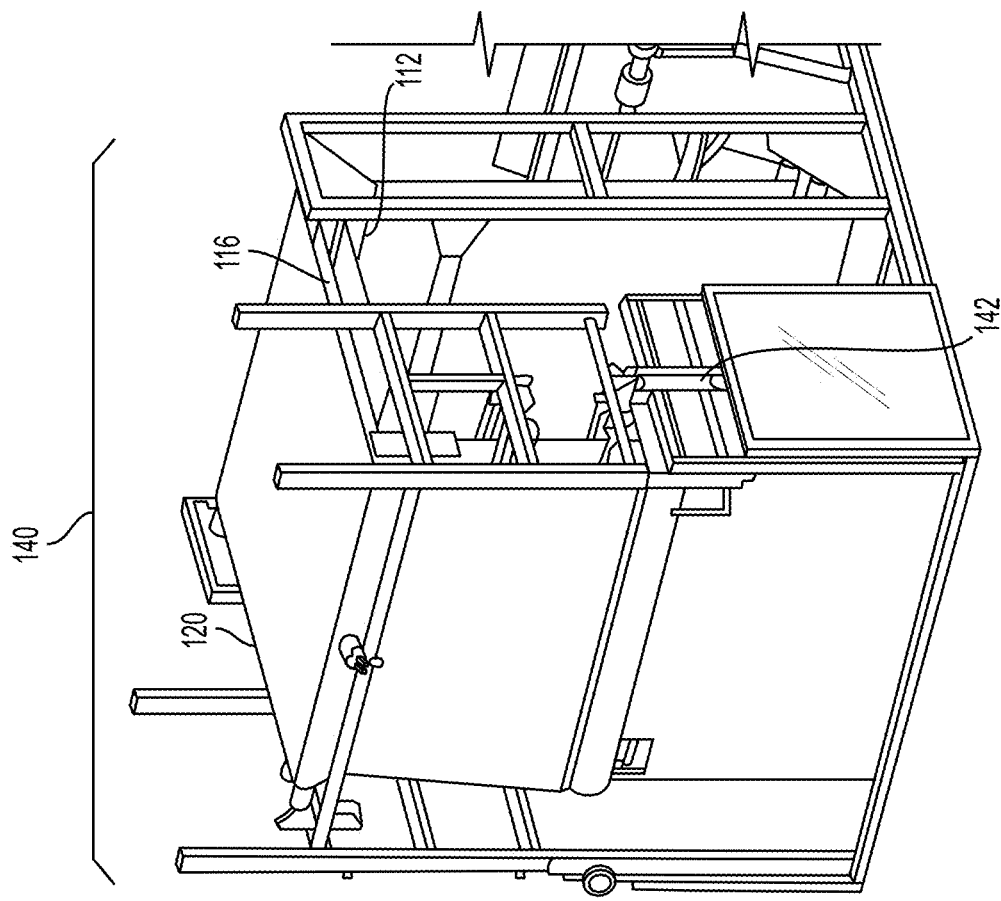
FIG. 4 is a perspective view taken from a top, front, left side of an impregnation module comprising an impregnator being a sub-portion of the manufacturing line of FIG. 2.

As further illustrated in FIG. 4, the first roll of Kraft paper 120, the second roll of Kraft paper 112 and the third roll of fabric 116 fed the impregnation module 140 via a top portion of the impregnation module 140. The impregnation module 140 comprises an impregnator 140. In the illustrated embodiments, the impregnation module 140 is adapted for the manufacturing of composite skin and/or composite panels. The first Kraft paper layer 120, the second Kraft paper layer 112 and the fabric layer 116 are conveyed from the row material rack 110 within the impregnator module 140 by means of multiple mechanisms comprising actuatable rolls. The actuatable rolls may allow pulling the first Kraft paper layer 120, the second Kraft paper layer 112 and the fabric layer 116 within the impregnation module 140. In the illustrated embodiment, the first Kraft paper layer 120, the second Kraft paper layer 112 and the fabric layer 116 are positioned so that the fabric layer 116 is positioned between the first Kraft paper layer 120 and the second Kraft paper layer 112. The first Kraft paper layer 120, the second Kraft paper layer 112 and the fabric layer 116 are also oriented so as to move along a substantially vertical direction from the top of the impregnation module 140 to the bottom of the impregnation module 140.

Figure 5:
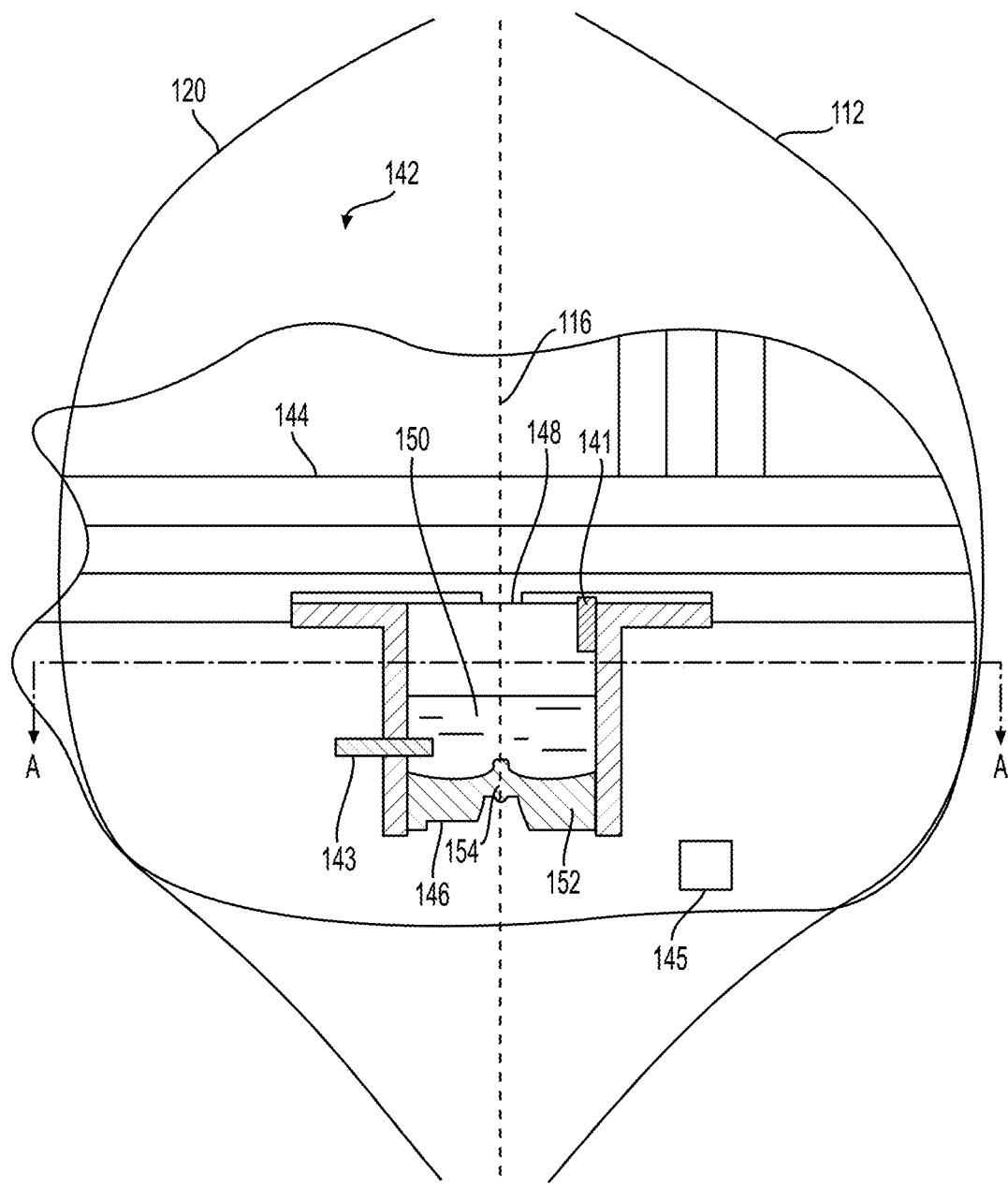
FIG. 5 is a cross-sectional view of an impregnator being a sub-portion of the impregnation module of FIG. 4.

Turning now to FIG. 5, a cross-sectional view of the impregnator 142 being attached to the impregnation module 140 via a frame 144 is shown. The impregnator 142 comprises a chamber 150, a first opening 148 and a second opening 154.

The chamber 150 extends along a longitudinal axis and is structured and arranged so as to retain a binding composition in a fluid state. In some embodiments, the binding composition is a bio resin. In some embodiments, a viscosity of the binding composition may be controlled, for example, via a temperature control system associated with the chamber 150 (not shown). In the illustrated embodiment, a sensor 141 is installed within the chamber 150 so as to measure a level of the binding composition within the chamber 150. In some embodiments, an inlet 143 and a controller 145 may be associated with the chamber 150. The inlet 143 may allow binding composition to be injected into the chamber 150 and the controller 145 may comprise control logic allowing to control the inlet 143 based on a reading generated by the sensor 141. In some embodiments, the control logic comprises instructions allowing to maintain a level of the binding composition constant while the fabric layer 116 translates through the chamber 150 so as to be impregnated with the binding composition. In some embodiments, the control logic allows controlling an impregnation rate of the binding composition by the fabric layer 116. In some embodiments, the controlling of the impregnation rate may be achieved by controlling a level of the binding composition in the chamber 150, a speed at which the fabric layer 116 moves through the binding composition and/or a width of the second opening 154.

The first opening 148 extends along a longitudinal axis of a top portion of the chamber 150. The first opening 148 may be dimensioned, structured and arranged so that a fabric layer, such as the fabric layer 116, may enter the chamber 150 in a dry state from the top portion of the chamber 150 before being dived into the binding composition. The second opening 154 extends along a longitudinal axis of a bottom portion of the chamber 150. The second opening 154 may be dimensioned, structured and arranged so that the fabric layer may exit the chamber 150 from the bottom portion of the chamber 150 in an impregnated state. As can be seen on FIG. 5, the second opening 154 comprises a first lip 146 structured and arranged so as to be in contact with a first surface of the fabric layer 116 and a second lip 152 structured and arranged so as to be in contact with a second surface of the fabric layer 116. The second opening 154 formed by the first lip 146 and the second lip 152 may be dimensioned so as to be slightly wider than a thickness of the fabric later 116 so as to form a relatively sealed assembly avoiding the binding composition to leak through the second opening 154.

In some embodiments, the first lip 146 and the second lip 152 form a control assembly allowing control of an impregnation rate of the binding composition impregnating the fabric layer. The first lip 146, the fabric layer 116 and the second lip 152 form a sealing assembly allowing the fabric layer 116 to translate through the second opening while preventing the binding composition to leak from the chamber 150.

Figure 6:
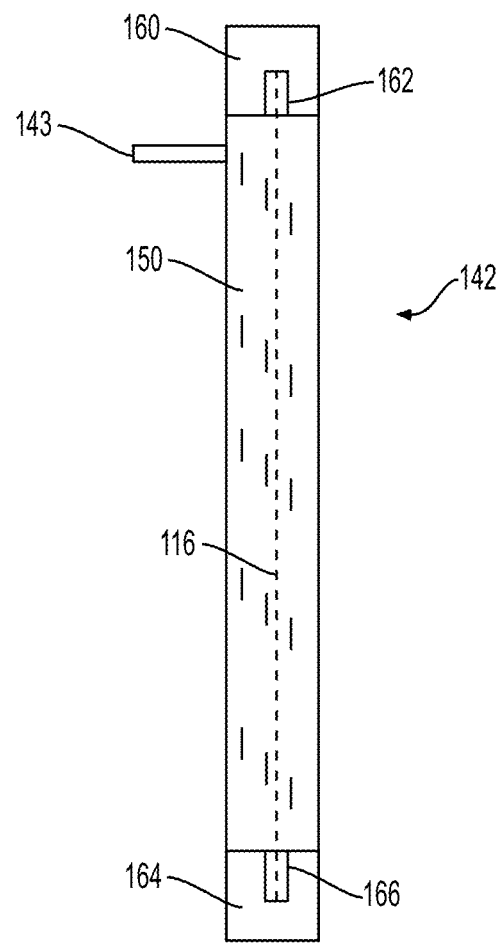
FIG. 6 is a sectional view of the impregnator of FIG. 5 being taken along the line A-A of FIG. 5.

Turning now to FIG. 6, a sectional view of the impregnator 142 taken along the line A-A of FIG. 5 is shown. The sectional view is taken from the top. The binding composition is located within the chamber 150. A first lateral seal 160 is positioned at a first lateral extremity of the chamber 150. A second lateral seal 164 is positioned at a second lateral extremity of the chamber 150. The first lateral seal 160 comprises a first opening 162 allowing a first lateral band of the fabric layer 116 to remain dry while the fabric layer 116 translates through the chamber 150. The first opening 162 may be dimensioned so as to be slightly wider than a thickness of the fabric later 116 so as to form a relatively sealed assembly avoiding the binding composition to leak through the first opening 162. Similarly, the second lateral seal 164 comprises a second opening 166 allowing a second lateral band of the fabric layer 116 to remain dry while the fabric layer 116 translates through the chamber 150. The second opening 166 may be dimensioned so as to be slightly wider than a thickness of the fabric later 116 so as to form a relatively sealed assembly avoiding the binding composition to leak through the second opening 166.

Figure 7:
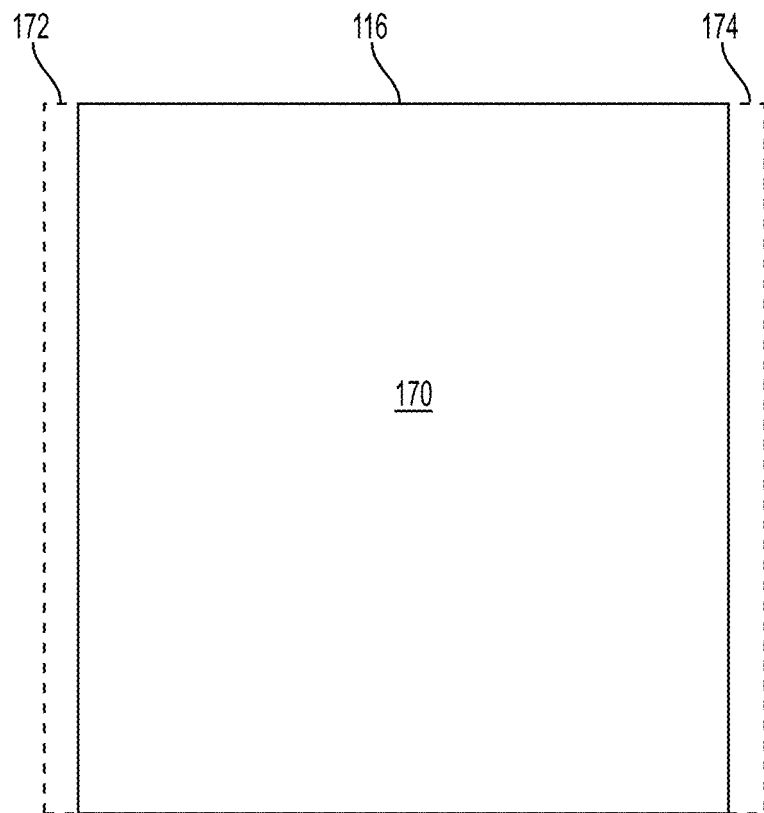
FIG. 7 is a front view of a section of an impregnated fabric layer after impregnation through the impregnator of FIG. 6.

As an example, FIG. 7 illustrates a front elevational view of a segment of the fabric layer 116 having exited the chamber 150. As can be seen, the fabric layer 116 comprises an impregnated area 170, a first lateral band 172 and a second lateral band 174. Only the impregnated area 170 has been impregnated while the first lateral band 172 and the second lateral band 174 having translated through the first opening 162 and the second opening 166 remain dry. Amongst multiple benefits, the first lateral band 172 and the second lateral band 174 may act as a "buffer zone" when pressure is applied on the fabric layer 116 down the manufacturing line 100. Upon being subjected to pressure, at least a portion of the binding composition may be pushed towards the first lateral band 172 and the second lateral band 174. The first lateral band 172 and the second lateral band 174 may absorb the overflow of the binding composition thereby limiting spilling of the binding composition from the lateral sides of the fabric layer 116.

As a person skilled in the art of the present technology may appreciate, the impregnator 142 allows impregnating the fabric layer 116 while the first Kraft paper layer 120 and the second Kraft paper layer 112 remain dry. After the fabric layer 116 has been impregnated, the first Kraft paper layer 120, the fabric layer 116 and the second Kraft paper layer 112 may be reassembled at a position downstream the impregnator 142 to form a pre-impregnated multilayer assembly. The pre-impregnated multilayer assembly may be then subjected to a pressure selected so as to diffuse the binding composition from the fabric layer 116 to the first Kraft paper layer 120 and the second Kraft paper layer 112. The pre-impregnated multilayer assembly may then be cured to form a composite skin and/or a composite panel.

In some embodiments, after the fabric layer 116 has been impregnated and the first Kraft paper layer 120, the fabric layer 116 and the second Kraft paper layer 112 have been reassembled to form the pre-impregnated multilayer assembly, the pre-impregnated multilayer assembly may be laid out on the conveyor 170 and cut up to form a first composite skin of a given size. In some embodiments wherein a composite panel is to be produced, a foam core, such as the foam core 50, may then be positioned on top of the first composite skin. A second composite skin may then be produced from the first Kraft paper layer 120, the fabric layer 116 and the second Kraft paper layer 112. The second composite skin may then be laid out on top of the foam core 50 and cut up. In some embodiments, powder coating may be applied on the first composite skin and/or the second composite skin. The composite panel comprising the first composite skin, the foam core and the second composite skin may then be conveyed into the curing module 180. In some embodiments, the curing module 180 combines at least three functionalities, namely (1) a first function allowing the curing module 180 to apply pressure on the composite panel so that the binding composition of the first composite skin and the second composite skin diffuses from the fabric layers to Kraft paper layers; (2) a second function allowing the curing module 180 to cure the composite panel thereby allowing the binding composition to solidify; and (3) a third function allowing the curing module 180 to cool the composite panel at a higher rate than if the composite panel was cooled by ambient air thereby improving a solidification process of the binding composition and reducing a production cycle time. In some embodiments, the first function, the second function and/or the third function are applied sequentially.

Once the composite panel is cured and cooled, the composite panel may be moved from the curing module 180 to a stocking module such as the stocking module 190 of FIG. 2.

Figure 8:
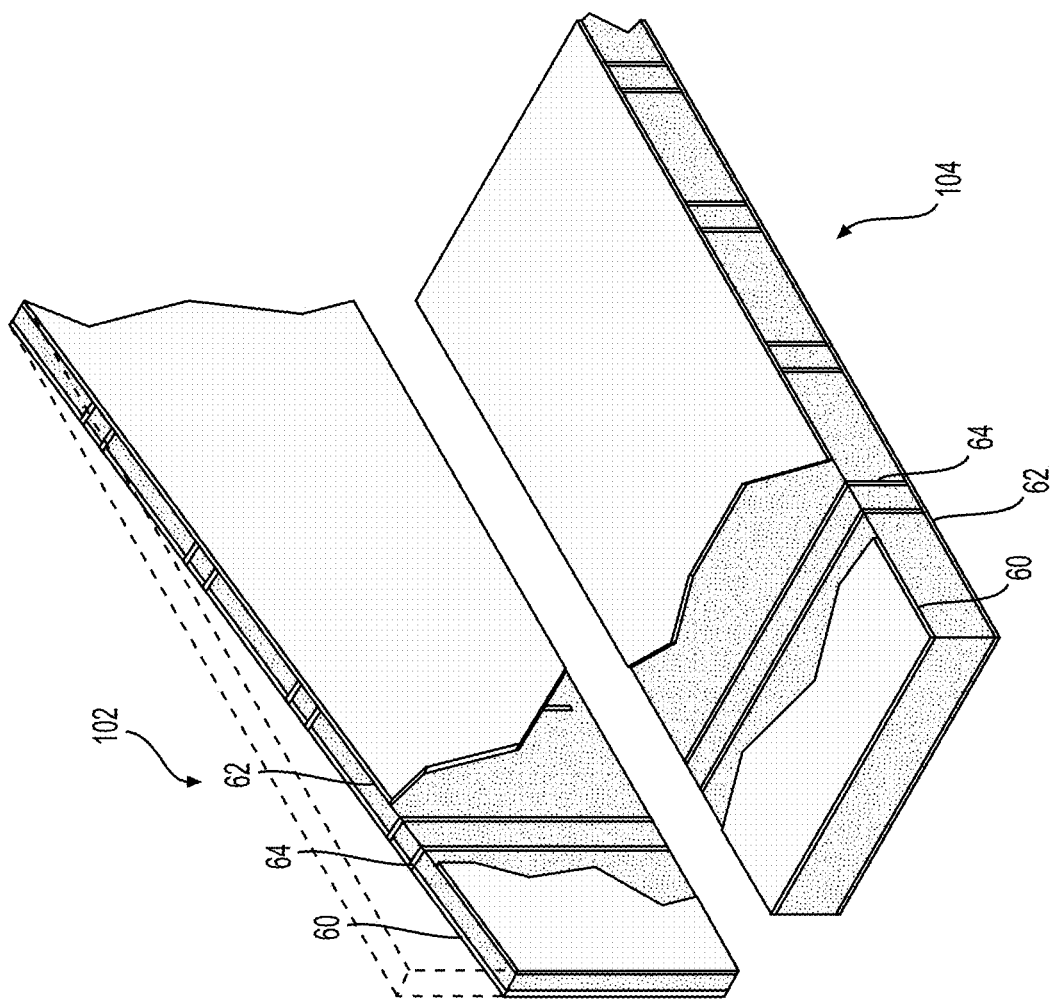
FIG. 8 is a front view taken from a top, front, left side of a first composite panel and of a second composite panel in accordance with an embodiment of the present technology.

Turning now to FIG. 8, an alternative embodiment of composite panels 102 and 104 are shown. Similarly to the composite panel 10 of FIG. 1, the composite panels 102 and 104 comprise a first composite skin 60 and a second composite skin 62. As for the composite panel 10, the first composite skin 60 and the second composite skin 62 are coplanar. In both the composite panels 102 and 104, a third composite skin 64 extends perpendicularly from the first composite skin 60 to the second composite skin 62. The third composite skin 64 may be made from a fabric layer, a first Kraft paper layer and a second Kraft paper layer as it is the case for the first composite skin 60 and the second composite skin 62. The third composite skin 64 may have a different thickness than the first composite skin 60 and the second composite skin 62. The third composite skin 64 extends through respective foam cores of the composite panels 102 and 104. In some embodiments, multiple composite skins such as the third composite skin 64 may be positioned across the foam cores of the composite panels 102 and 104. In some embodiments, such construction may allow reinforcing a rigidity of the composite panels 102 and 104. In some embodiments, the composite panel 102 may be used for the manufacturing of side panels of air conditioning cases and the composite panel 104 may be used for the manufacturing of floor panels of air conditioning cases.

Figure 9:
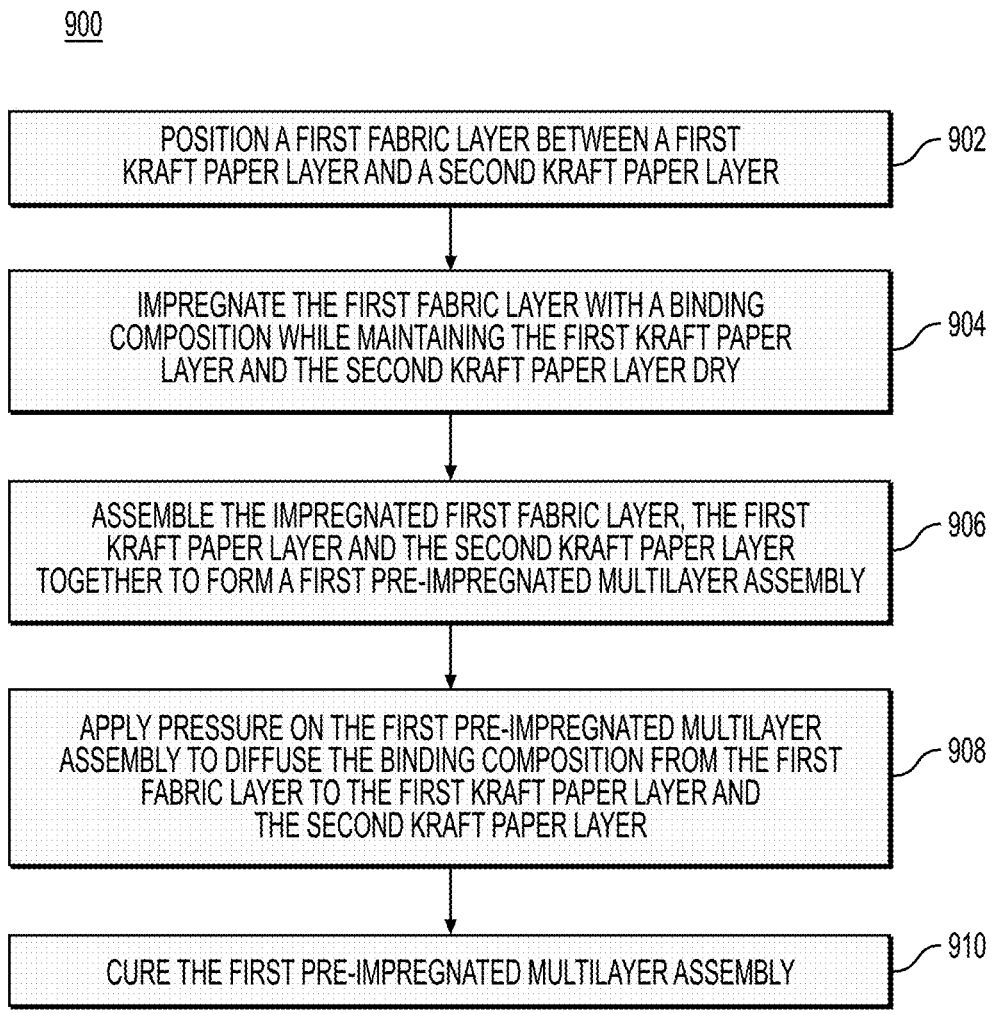
FIG. 9 is a diagram illustrating a flowchart illustrating a method for manufacturing composite panels in accordance with an embodiment of the present technology.

Turning now to FIG. 9, a flowchart illustrating a method for manufacturing composite panels, composite skins and/or composite material is disclosed. In some embodiments, the method 900 may be (completely or partially) implemented on the manufacturing line 100.

The method 900 may start at step 902 by positioning a first fabric layer between a first Kraft paper layer and a second Kraft paper layer. In some embodiments, positioning the first fabric layer between the first Kraft paper layer and the second Kraft paper layer further comprises positioning a first veil layer between the first fabric layer and the first Kraft paper layer and positioning a second veil layer between the first fabric layer and the second Kraft paper layer. In some embodiments, positioning the first fabric layer between the first Kraft paper layer and the second Kraft paper layer comprises unrolling a first roll comprising the first fabric layer, unrolling a second roll comprising the first Kraft paper layer and unrolling a third roll comprising the second Kraft paper layer.

Then, at a step 904, the method 900 proceeds to impregnating the first fabric layer with a binding composition while maintaining the first Kraft paper layer and the second Kraft paper layer dry. In some embodiments, impregnating the first fabric layer comprises translating the first fabric layer through an impregnator containing the binding composition. In some embodiments, impregnating the first fabric layer is conducted while the first Kraft paper layer and the second Kraft paper layer are bypassing the impregnator.

At a step 906, the method 900 proceeds to assembling the impregnated first fabric layer, the first Kraft paper layer and the second Kraft paper layer together to form a first pre-impregnated multilayer assembly. In some embodiments, the impregnated first fabric layer, the first Kraft paper layer and the second Kraft paper layer are assembled downstream the impregnator.

At a step 908, the method 900 proceeds to applying pressure on the first pre-impregnated multilayer assembly to diffuse the binding composition from the first fabric layer to the first Kraft paper layer and the second Kraft paper layer. At a step 910, the method 900 proceeds to curing the first pre-impregnated multilayer assembly.

In some embodiments, the method 900 further comprises, prior to applying pressure on the first pre-impregnated multilayer assembly:

laying the first pre-impregnated multilayer assembly on a first surface of a foam core;

cutting up the first pre-impregnated multilayer assembly;

forming a second pre-impregnated multilayer assembly from the impregnated first fabric layer, the first Kraft paper layer and the second Kraft paper layer;

laying the second pre-impregnated multilayer assembly on a second surface of the foam core; and cutting up the second pre-impregnated multilayer assembly.

In some embodiments, applying pressure on the first pre-impregnated multilayer assembly further comprises applying pressure on the foam core and the second pre-impregnated multilayer assembly so that the binding composition penetrates the first Kraft paper layer and the second Kraft paper layer of the first pre-impregnated multilayer assembly and penetrates the first Kraft paper layer and the second Kraft paper layer of the second pre-impregnated multilayer assembly.

In some embodiments, curing the first pre-impregnated multilayer assembly further comprises curing the foam core and the second pre-impregnated multilayer assembly so as to form a composite panel.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A composite panel comprising:
   a first composite skin having a first fabric layer positioned between a first Kraft paper layer and a second Kraft paper layer;
   a second composite skin having a second fabric layer positioned between a third Kraft paper layer and a fourth Kraft paper layer, wherein the first composite skin and the second composite skin are coplanar;
   a foam core bonded to the first composite skin and to the second composite skin;
   a binding composition applied to the first fabric layer and to the second fabric layer and penetrating the second Kraft paper layer and the third Kraft paper layer so that the first composite skin is bonded to a first surface of the foam core and the second composite skin is bonded to a second surface of the foam core, the binding composition being a bio resin; and
   a third composite skin having a third fabric layer positioned between a fifth Kraft paper layer and a sixth Kraft paper layer, the third composite skin connecting to the first composite skin and to the second composite skin by extending through the foam core perpendicularly to the first composite skin and the second composite skin.

2. The composite panel of claim 1, wherein the first fabric layer and the second fabric layer comprise glass fibers, the glass fibers having a wet lay up thickness of about 2.4 millimeters.

3. The composite panel of claim 1, wherein the foam core is made of PolyEthylene Terephthalate (PET).

4. The composite panel of claim 1, wherein the second Kraft paper layer and the third Kraft paper layer have a weight of 127 g/m$^2$.

5. A casing of an air conditioning unit comprising the composite panel of claim 1.

6. The composite panel of claim 1, wherein the binding composition penetrates the first Kraft paper layer and the fourth Kraft paper layer, thereby forming a first hardened surface of the composite panel corresponding to the first Kraft paper layer and a second hardened surface of the composite panel corresponding to the fourth Kraft paper layer.

7. The composite panel of claim 1, wherein the second Kraft paper layer and the third Kraft paper layer allow penetration by the binding composition.

8. The composite panel of claim 1, wherein the second Kraft paper layer and the third Kraft paper layer have a weight which ranges from 122 g/m$^2$ to 137 g/m$^2$.

9. The composite panel of claim 1, wherein the composite panel meets the norm ASTM E84 Cl.1 and withstands a temperature delta between a first environment contacting the first composite skin and a second environment contacting the second composite skin of about 40 Celsius degrees without bending.

* * * * *